United States Patent
Heo et al.

(10) Patent No.: US 8,048,395 B2
(45) Date of Patent: Nov. 1, 2011

(54) METHOD OF COATING CATALYST METAL LAYER BY USING NUCLEIC ACID AND METHOD OF FORMING NANOCARBON BY USING THE METHOD OF COATING THE CATALYST METAL LAYER

(75) Inventors: Jeong-na Heo, Yongin-si (KR); Ho-suk Kang, Seoul (KR); Yong-chul Kim, Seoul (KR); Yoon-chul Son, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 154 days.

(21) Appl. No.: 12/539,975

(22) Filed: Aug. 12, 2009

(65) Prior Publication Data

US 2010/0233066 A1    Sep. 16, 2010

(30) Foreign Application Priority Data

Mar. 16, 2009  (KR) .................. 10-2009-0022183

(51) Int. Cl.
*D01F 9/12*  (2006.01)

(52) U.S. Cl. .................. 423/447.1; 423/447.2; 977/740; 977/742

(58) Field of Classification Search .............. 423/447.1, 423/447.3, 445 B, DIG. 40; 977/742, 743, 977/842, 843
See application file for complete search history.

(56) References Cited

U.S. PATENT DOCUMENTS

| | | | |
|---|---|---|---|
| 7,338,554 B2 * | 3/2008 | Delaunay et al. | 117/3 |
| 2003/0185985 A1 | 10/2003 | Bronikowski et al. | |
| 2005/0151126 A1 * | 7/2005 | Yamakawa et al. | 257/22 |

FOREIGN PATENT DOCUMENTS

| | | |
|---|---|---|
| JP | 2001-181842 | 7/2001 |
| KR | 1020040080868 A | 9/2004 |

OTHER PUBLICATIONS

Liu, Y.; Wei, W.; "A novel carbon nanotube-modified biosensor containing a dsDNA-Ni(II) complex membrane, and its use for electrocatalytic oxidation of methanol in alkaline medium", Microchim Acta (2008) 162: 245-251.*
"Production of single-walled carbon nanotubes with narrow diameter distribution using iron nanoparticles derived from DNA-binding proteins from starved cells"; Authors: Goo-Hwan Jeong, et al.; Carbon 45 (2007) 978-983.

* cited by examiner

*Primary Examiner* — Stuart Hendrickson
*Assistant Examiner* — Richard M Rump
(74) *Attorney, Agent, or Firm* — Cantor Colburn LLP

(57) ABSTRACT

Provided are a method of coating a catalyst metal layer by using a nucleic acid, and a method of forming nanocarbon using the method of coating a catalyst metal layer. The method of coating a catalyst metal layer includes preparing an aqueous solution; the aqueous solution including ions of a transition metal and a nucleic acid; disposing a carbon matrix including carbon, in the aqueous solution, and disposing a catalyst metal layer including a transition metal on a surface of the carbon matrix.

16 Claims, 3 Drawing Sheets

METHOD OF COATING CATALYST METAL LAYER BY USING NUCLEIC ACID AND METHOD OF FORMING NANOCARBON BY USING THE METHOD OF COATING THE CATALYST METAL LAYER

CROSS-REFERENCE TO RELATED APPLICATIONS

This application claims priority to Korean Patent Application No. 10-2009-0022183, filed on Mar. 16, 2009, and all benefits accruing therefrom under 35 U.S.C. §119, the contents of which in its entirety are herein incorporated by reference.

BACKGROUND

1. Field

Disclosed herein is a method of coating a catalyst metal layer on a surface of a carbon matrix by using a nucleic acid, and a method of forming nanocarbon on the carbon matrix by using the method.

2. Description of the Related Art

Carbon fibers have excellent electrical properties (e.g., high electrical conductivity) and mechanical properties (e.g., tensile strength), and thus research is being conducted into methods of using carbon fibers in various devices. When carbon nanotubes ("CNTs") are grown on a surface of a carbon fiber, a fiber-type device having excellent electrical characteristics may be manufactured. Such a fiber-type device may be used as a fiber-type emitter (having excellent light emitting characteristics) in a light emitting device including a field emission display or a field emission type backlight unit that uses light emitting characteristics of the CNTs. Also, the fiber-type device may be used in a variety of applications, such as, for example, a complex material using carbon and nanocarbon, an electrical device using a carbon material, a lightweight material using a carbon material, an energy material using a carbon material, or a semiconductor material using a carbon material.

Meanwhile, a product including carbon, such as a carbon fiber, has a hydrophobic surface, and thus has low coherence with a material that is disposed in an aqueous solution. Accordingly, it is difficult to combine CNTs dispersed in an aqueous solution with a surface of a product including carbon such as a carbon fiber.

SUMMARY

Disclosed herein is a method of coating a catalyst metal layer on a surface of a carbon matrix by using a nucleic acid, and a method of disposing nanocarbon on the carbon matrix by using the method of coating the catalyst metal layer.

Additional aspects will be set forth in part in the description which follows and, in part, will be apparent from the description, or may be learned by practice of the presented embodiments.

To achieve the above and/or other aspects, one or more embodiments may include a method of coating a catalyst metal layer, the method including preparing an aqueous solution; the aqueous solution including ions of a transition metal and a nucleic acid; disposing a carbon matrix in the aqueous solution; the carbon matrix including carbon; and coating a catalyst metal layer that includes the transition metal on a surface of the carbon matrix by using the nucleic acid as a medium.

The nucleic acid in the aqueous solution may react with the transition metal ions and carbon atoms of the carbon matrix to coat the catalyst metal layer on the surface of carbon matrix.

The nucleic acid may include deoxyribonucleic acid ("DNA") or ribonucleic acid ("RNA"). Examples of the transition metal are nickel ("Ni"), iron ("Fe"), chromium ("Cr"), or a combination comprising at least one of the foregoing metals.

The carbon matrix may include graphite, graphene, highly oriented pyrolytic graphite ("HOPG"), a carbon fiber, a carbon nanotubes, or a combination comprising at least one of the foregoing forms of carbon.

To achieve the above and/or other aspects, one or more embodiments may include a method of forming nanocarbon, the method including preparing an aqueous solution; the aqueous solution including ions of a transition metal and a nucleic acid; disposing a carbon matrix in the aqueous solution; the carbon matrix including carbon; disposing a catalyst metal layer that includes the transition metal, on a surface of the carbon matrix; and growing nanocarbon from the catalyst metal layer.

A method of forming nanocarbon, the method comprising preparing an aqueous solution; the aqueous solution comprising ions of a transition metal and a nucleic acid; disposing a carbon matrix in the aqueous solution; the carbon matrix comprising carbon; disposing a catalyst metal layer comprising the transition metal on a surface of the carbon matrix; disposing the carbon matrix with the catalyst metal layer disposed thereon in a chemical vapor deposition furnace that contains a carbon containing gas; and growing nanocarbon from the catalyst metal layer.

The nucleic acid in the aqueous solution may react with the transition metal ions and carbon atoms of the carbon matrix to coat the catalyst metal layer on the surface of the carbon matrix.

The method may further include removing the carbon matrix coated with the catalyst metal layer from the aqueous solution, and cleaning and drying the carbon matrix.

The nano carbon may be grown on the surface of the carbon matrix using a chemical vapor deposition (CVD) method. The nano carbon may include carbon nanotubes, a nano fiber, or a nano coil.

BRIEF DESCRIPTION OF THE DRAWINGS

These and/or other aspects, advantages, and features of the invention will become more apparent by describing in further detail exemplary embodiments thereof with reference to the attached drawings, in which.

DETAILED DESCRIPTION

Figure 1:
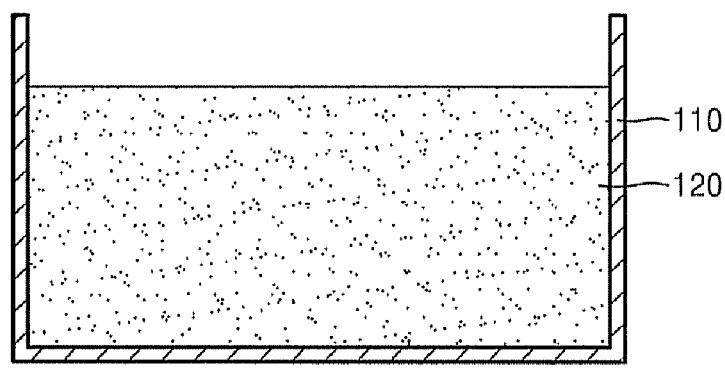
FIGS. 1 through 4 are exemplary diagrams for describing a method of disposing nanocarbon on a surface of a carbon matrix by using a nucleic acid.

Reference will now be made in detail to embodiments, examples of which are illustrated in the accompanying drawings, wherein like reference numerals refer to the like elements throughout and sizes or thicknesses of elements may be exaggerated for clarity.

Aspects, advantages, and features of exemplary embodiments of the invention and methods of accomplishing the same may be understood more readily by reference to the following detailed description of embodiments and the accompanying drawings. The exemplary embodiments of the invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the exemplary embodiments of the invention will only be defined by the appended claims. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the exemplary embodiments of the invention.

Spatially relative terms, such as "below," "lower," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation can result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Disclosed herein is a method of uniformly coating a catalyst metal layer comprising a transition metal on a surface of a carbon matrix by using a nucleic acid, and growing and forming nanocarbon from the coated catalyst metal layer.

FIGS. 1 through 4 are diagrams for describing a method of disposing a nanocarbon 150 on a surface of a carbon matrix 130 by using a nucleic acid.

First, referring to FIG. 1, an aqueous solution 120, in which a nucleic acid and ions of a transition metal are dispersed, is prepared in a water tank 110. Here, the nucleic acid may be, for example, deoxyribonucleic acid ("DNA"), ribonucleic acid ("RNA"), or a combination comprising at least one of the foregoing nucleic acids. Also, the transition metal may be Ni, Fe, Cr, or an alloy thereof. An example of an alloy is Invar that is an alloy of Fe and Ni.

Figure 2:
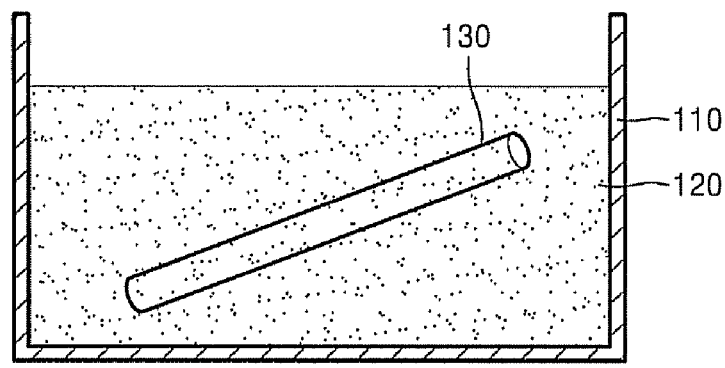

Referring to FIG. 2, the carbon matrix 130 that includes carbon is supported in the aqueous solution 120. Here, the carbon matrix 130 may include graphite, graphene, highly oriented pyrolytic graphite ("HOPG"), a carbon fiber, a carbon nanotubes, or a combination comprising at least one of the foregoing forms of carbon.

Figure 3:
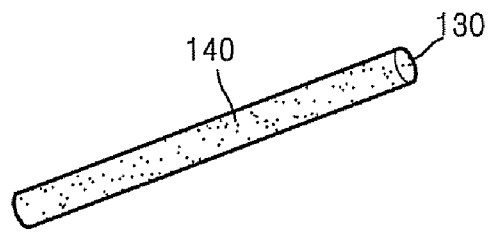

Generally, when the nucleic acid, such as DNA or RNA, is mixed with the ions of the transition metal, the structure and functions of the nucleic acid change. Without being limited to theory, a base of the nucleic acid reacts with cations of the transition metal, thereby interfering with a hydrogen bond in the nucleic acid or otherwise changing the structure of the nucleic acid. The nucleic acid also reacts with carbon atoms of the carbon matrix 130. The base of the nucleic acid mixes with Tr electrons of the carbon atoms present in the carbon matrix 130 to generate a hydrophobic reaction. Accordingly, when the carbon matrix 130 is supported in the aqueous solution 120 in which the nucleic acid and the ions of the transition metal are dispersed, the nucleic acid in the aqueous solution 120 is not only reacted with the ions of the transition metal but also with the carbon in the carbon matrix 130, and thus a catalyst metal layer 140 as illustrated in FIG. 3 formed of the transition metal may be disposed on the surface of the carbon matrix 130 in the aqueous solution 120. Also, when the nucleic acid is used, the transition metal may be easily disposed on the hydrophobic surface of the carbon matrix 130. In addition, the transition metal may be very uniformly coated on the surface of the carbon matrix 130. Also, referring to FIG. 3, the carbon matrix 130 coated with the catalyst metal layer 140 is removed from the aqueous solution 120. Then, the carbon matrix 130 is cleaned and dried. Accordingly, the catalyst metal layer 140 comprising the transition metal is uniformly disposed on the surface of the carbon matrix 130.

Figure 4:
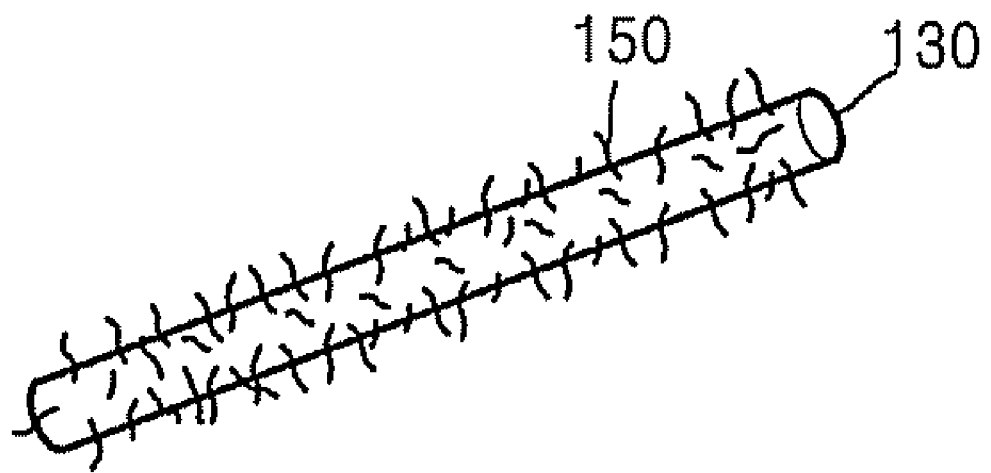

Then, referring to FIG. 4, the nanocarbon 150 is grown and formed on the surface of the catalyst metal layer 140 using a chemical vapor deposition (CVD) method. By uniformly coating the catalyst metal layer 140, the nanocarbon 150 may be grown on the surface of the carbon matrix 130 to have a uniform diameter and uniform density. Here, the nanocarbon 150 grown on the surface of the carbon matrix 130 may be carbon nanotubes ("CNTs"), and may also be a nanofiber or a nanocoil, according to conditions of the CVD method. Meanwhile, in the performing of the CVD method, the nucleic acid coated on the surface of the carbon matrix 130 is removed using a high temperature process, but phosphate in the nucleic acid may remain on the surface of the carbon matrix 130.

Figure 5:
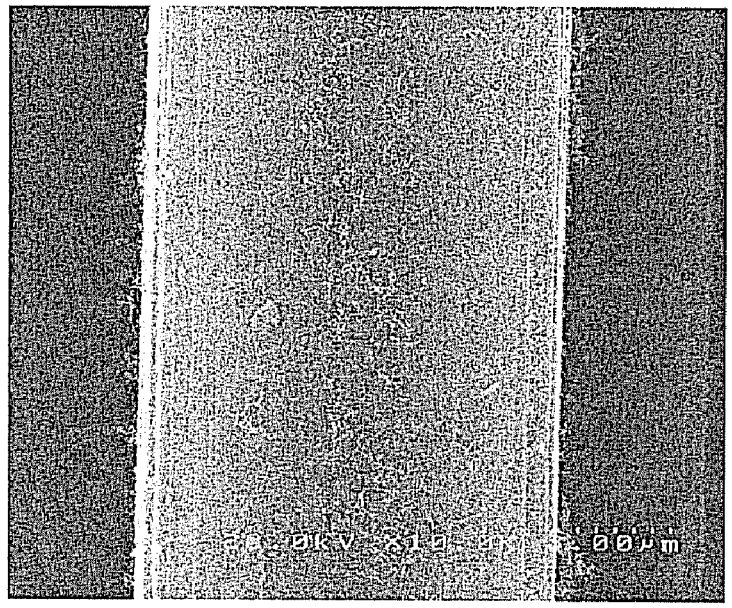
FIG. 5 is a photographic image of carbon nanotubes grown on a surface of a carbon fiber by using a nucleic acid.

FIG. 5 is a photographic image of CNTs grown from a catalyst metal layer using a CVD method, after disposing the catalyst metal layer on a surface of a carbon fiber by using a nucleic acid, as described above. Here, the catalyst metal layer was disposed using an aqueous solution including the nucleic acid and ions of a transition metal, as described above. In this regard, the ions of the transition metal were nickel ($Ni^{+2}$) ions, and the carbon fiber constituted the carbon matrix (130) described above. In detail, RNA, (constituting the nucleic acid), was added to an aqueous solution in which $Ni^{+2}$ ions having a concentration of 0.01 M were dispersed in water, and then the carbon fiber was supported in the aqueous solution for about 80 hours, so as to coat the catalyst metal layer on a surface of the carbon fiber. The concentration of the RNA with respect to the water is 50 micrograms per milliliter ("μg/ml"). Then, the carbon fiber on which the catalyst metal layer was disposed was cleaned and dried. The carbon fibers with the catalyst metal layer disposed thereon were then placed in a furnace containing a carbon containing gas at an elevated temperature. The CNTs were grown on the surface of the carbon fiber by using acetylene ($C_2H_2$) gas, at a temperature of about 700° C. The $C_2H_2$ gas decomposes to form CNTs on the surface of the carbon fiber.

In one embodiment, the temperature of the furnace may be about 600 to about 1,300° C., specifically about 700 to about 1,100° C. Examples of carbon containing gases are acetylene, methane, ethane, propane, propylene, ethylene, benzene, naphthalene, or the like, or a combination comprising at least one of the foregoing carbon containing gases.

Figure 6:
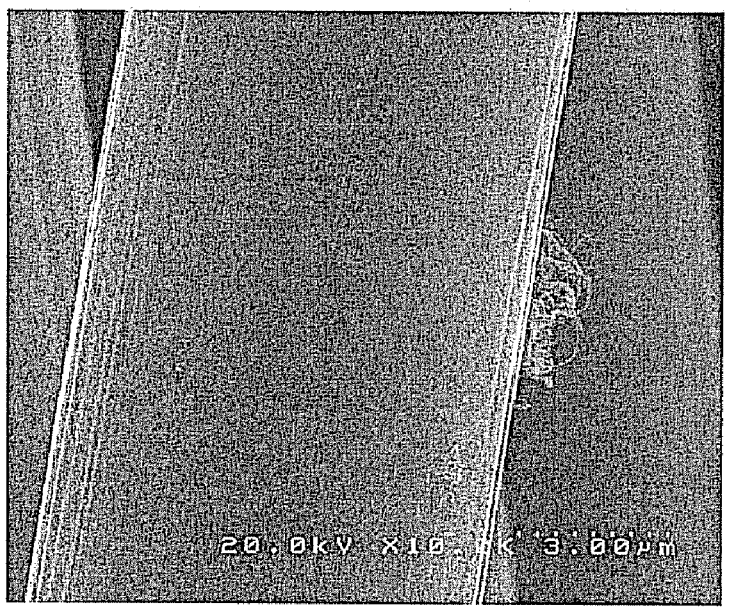
FIG. 6 is a photographic image of carbon nanotubes grown on a surface of a carbon fiber without using a nucleic acid.

FIG. 6 is a photographic image of CNTs grown from a catalyst metal layer disposed on the surface of a carbon matrix. The CNTs are grown using a CVD method, after disposing the metal catalyst layer on a surface of a carbon fiber without using a nucleic acid. Here, the catalyst metal layer was formed using an aqueous solution and ions of a transition metal. In this regard, the ions of the transition metal were $Ni^{+2}$ ions, and the carbon fiber was similar to the carbon matrix (130) described above. In detail, the carbon fiber was supported in an aqueous solution in which $Ni^{+2}$ ions having a concentration of 0.01 M were dispersed in water for about 80 hours, so as to coat the catalyst metal layer on a surface of the carbon fiber. Then, the carbon fiber on which the catalyst metal layer was disposed was cleaned and dried. The carbon fibers with the catalyst metal layer disposed thereon were then placed in a furnace containing a carbon containing gas at an elevated temperature. The CNTs were grown on the surface of the carbon fiber by using $C_2H_2$ gas, constituting a reaction gas, at a temperature of about 700° C. The $C_2H_2$ gas decomposes to form CNTs on the surface of the carbon fiber.

Referring to FIGS. 5 and 6, when a catalyst metal layer is coated on the surface of a carbon fiber by using a nucleic acid, CNTs are uniformly grown on the surface of the carbon fiber as shown in FIG. 5. However, when a catalyst metal layer is coated on the surface of a carbon fiber without using a nucleic acid, the CNTs may not grow on the surface of the carbon fiber or alternatively they may be non-uniformly grown on the surface of the carbon fiber. Without being limited to theory, it is believed that it is difficult to coat the catalyst metal layer on the carbon fiber in the absence of the nucleic acid. This is believed to be due to the hydrophobic surface of the carbon fiber, and thus as shown in FIG. 6, the CNTs may not be grown or may be non-uniformly grown on the surface of the carbon fiber.

As described above, a catalyst metal layer comprising a transition metal may be uniformly coated on the hydrophobic surface of a carbon matrix by using a nucleic acid, and accordingly, nanocarbon in the form of CNTs having a uniform diameter and density may be grown and formed on the surface of the carbon matrix.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of coating a catalyst metal layer, the method comprising:
    preparing an aqueous solution; the aqueous solution comprising ions of a transition metal and a nucleic acid;
    disposing a carbon matrix in the aqueous solution; the carbon matrix comprising carbon; and
    disposing a catalyst metal layer comprising the transition metal on a surface of the carbon matrix.

2. The method of claim 1, wherein the nucleic acid in the aqueous solution reacts with the transition metal ions and carbon atoms of the carbon matrix, thereby disposing the catalyst metal layer on the surface of carbon matrix.

3. The method of claim 1, wherein the nucleic acid comprises deoxyribonucleic acid, ribonucleic acid or a combination comprising at least one of the deoxyribonucleic acid or the ribonucleic acid.

4. The method of claim 1, wherein the transition metal is nickel, iron, chromium, or a combination comprising at least one of nickel, iron or chromium.

5. The method of claim 1, wherein the carbon matrix comprises carbon; the carbon being graphite, graphene, highly oriented pyrolytic graphite, carbon fibers, carbon nanotubes, or a combination comprising at least one of the foregoing forms of carbon.

6. A method of forming nanocarbon, the method comprising:
    preparing an aqueous solution; the aqueous solution comprising ions of a transition metal and a nucleic acid;
    disposing a carbon matrix in the aqueous solution; the carbon matrix comprising carbon;
    disposing a catalyst metal layer comprising the transition metal on a surface of the carbon matrix; and
    growing nanocarbon from the catalyst metal layer.

7. The method of claim 6, wherein the nucleic acid in the aqueous solution reacts with the transition metal ions and carbon atoms of the carbon matrix, thereby disposing the catalyst metal layer on the surface of the carbon matrix.

8. The method of claim 6, wherein the nucleic acid comprises deoxyribonucleic acid, ribonucleic acid or a combination comprising at least one of the deoxyribonucleic acid or the ribonucleic acid.

9. The method of claim 6, wherein the transition metal nickel, iron, chromium, or a combination comprising at least one of nickel, iron or chromium.

10. The method of claim 6, wherein the carbon matrix comprises carbon; the carbon being graphite, graphene, highly oriented pyrolytic graphite, carbon fibers, carbon nanotubes, or a combination comprising at least one of the foregoing forms of carbon.

11. The method of claim 6, further comprising removing the carbon matrix from the aqueous solution, and cleaning and drying the carbon matrix.

12. The method of claim 6, wherein the nanocarbon is grown on the surface of the carbon matrix using a chemical vapor deposition method.

13. The method of claim 6, wherein the nanocarbon comprises carbon nanotubes, a nanofiber, or a nanocoil.

14. A method of forming nanocarbon, the method comprising:
preparing an aqueous solution; the aqueous solution comprising ions of a transition metal and a nucleic acid;
disposing a carbon matrix in the aqueous solution; the carbon matrix comprising carbon;
disposing a catalyst metal layer comprising the transition metal on a surface of the carbon matrix;
disposing the carbon matrix with the catalyst metal layer disposed thereon in a chemical vapor deposition furnace that contains a carbon containing gas; and
growing nanocarbon from the catalyst metal layer.

15. The method of claim 14, wherein the carbon containing gas is acetylene, methane, ethane, propane, propylene, ethylene, benzene, naphthalene, or a combination comprising at least one of the foregoing carbon containing gases.

16. The method of claim 14, wherein the temperature of the chemical vapor deposition furnace is operated at a temperature of about 600 to about 1,300° C.

* * * * *